US006253306B1

(12) United States Patent
Ben-Meir et al.

(10) Patent No.: US 6,253,306 B1
(45) Date of Patent: Jun. 26, 2001

(54) PREFETCH INSTRUCTION MECHANISM FOR PROCESSOR

(75) Inventors: Amos Ben-Meir, Cupertino; John G. Favor, Scotts Valley, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/124,098

(22) Filed: Jul. 29, 1998

(51) Int. Cl.$^7$ .................................................. G06F 15/00
(52) U.S. Cl. ............................ 712/207; 712/23; 712/209; 712/244
(58) Field of Search ............................ 712/23, 207, 209, 712/225, 244; 717/6, 9

(56) References Cited

U.S. PATENT DOCUMENTS

| 4,980,823 | * | 12/1990 | Liu ........................................ 711/136 |
| 5,615,386 | | 3/1997 | Amerson et al. ..................... 395/585 |
| 5,664,135 | | 9/1997 | Schlansker et al. ................. 395/377 |
| 5,704,053 | | 12/1997 | Santhanam ........................... 284/383 |
| 5,854,934 | * | 12/1998 | Hsu et al. ............................. 395/709 |
| 5,920,713 | * | 7/1999 | Favor .................................... 395/583 |
| 5,933,643 | * | 8/1999 | Holler .................................. 395/709 |
| 5,948,095 | * | 9/1999 | Arora et al. ......................... 712/200 |

OTHER PUBLICATIONS

MIPS Technologies, Inc., "MIPS IV Instruction Set", Revision 3.2, Sep. 1995, pp. A–10 through A–11 and A–16 through A–118.
Darcy, Joe and Fähndrich, Manuel, Computer Science Division, EECS University of California at Berkeley, "IRAM Project #1 History and State-of-the-Art of Compiler Controlled Hierarchy", http://cs.berkeley.edu/~darcy . . . mpcache/discussion/discussion.html (Dec. 29, 1997), Feb. 16, 1996, pp. 1–11.

Sun Microsystems, "5.0 Software Prefetch and multiple-outstanding misses", http://www.sun.com/sparc/appnotes/ 802–7254–01/5$_{13}$ 0.html (Dec. 20, 1997), pp. 1–4.

(List continued on next page.)

Primary Examiner—Larry D. Donaghue
(74) Attorney, Agent, or Firm—Zagorin, O'Brien & Graham, LLP (57) ABSTRACT

Accordingly, a prefetch instruction mechanism is desired for implementing a prefetch instruction which is non-faulting, non-blocking, and non-modifying of architectural register state. Advantageously, a prefetch mechanism described herein is provided largely without the addition of substantial complexity to a load execution unit. In one embodiment, the non-faulting attribute of the prefetch mechanism is provided though use of the vector decode supplied Op sequence that activates an alternate exception handler. The non-modifying of architectural register state attribute is provided (in an exemplary embodiment) by first decoding a PREFETCH instruction to an Op sequence targeting a scratch register wherein the scratch register has scope limited to the Op sequence corresponding to the PREFETCH instruction. Although described in the context of a vector decode embodiment, the prefetch mechanism can be implemented with hardware decoders and suitable modifications to decode paths will be appreciated by those of skill in the art based on the description herein. Similarly, although in one particular embodiment such a scratch register is architecturally defined to read as a NULL (or zero) value, any target for the Op sequence that is not part of the architectural state of the processor would also be suitable. Finally, in one embodiment the non-blocking attribute is provided by the Op sequence completing (without waiting for return of fill data) upon posting of a cache fill request to load logic of a data cache. In this way, LdOps which follow in a load pipe are not stalled by a prefetch-related miss and can instead execute concurrently with the prefetch-related line fill.

24 Claims, 5 Drawing Sheets

OTHER PUBLICATIONS

Weaver, David L. and Germond, Tom, "The SPARC Architecture Manual", SPARC International, Version 9, 1994, pp. 300–305.

Chen et al. Data Access Microarchitecture for Superscalar Processors with Compiler–Assisted Data Pretching; ACM 1991.*

Saavedras et al.; Improving the Effectiveness of Software Prefetching With Adaptive Execution; 1996.*

Mowry, Todd C., "Tolerating Latency Through Software–Controlled Data Prefetching", Ph.D. dissertation, Dept. of Electrical Engineering, Stanford University, Mar. 1994, pp. i–202.

Motorola Inc., "PowerPC™ Microprocessor Family: The Programming Environments", Motorola Inc., G522–0290–00, Rev. Jan. 1, 1997, pp. 4–64 through 4–68, 5–8 through 5–11, and 8–50 through 8–51.

Digital Equipment Corporation, "Alpha Architecture Handbook", EC–Qd2KB–TE, Oct. 1996, pp. 4–138 through 4–139 and A–10 through A–11.

* cited by examiner

PREFETCH INSTRUCTION MECHANISM FOR PROCESSOR

BACKGROUND OF THE INVENTION

1. Field of the Invention

The present invention generally relates to improved data cache performance in processors and more particularly to prefetching of data into a cache under control of a prefetch instruction.

2. Description of the Related Art

Computer systems typically include cache memories to reduce the cost of providing a processor with a high speed memory subsystem. A cache memory is a high-speed memory which acts as a buffer between the processor and main memory. Although smaller than the main memory, the cache memory is usually appreciably faster than the main memory. Memory subsystem performance can be increased by storing the most commonly used data in smaller but faster cache memory (or cache memories). Because most programs exhibit temporal and spatial locality, historical access patterns are reasonably predictive of future access patterns.

When the processor accesses a memory address, the cache memory determines if the data associated with the memory address is stored in the cache memory. If the data is stored in the cache memory, a cache hit results and the data is provided to the processor from the cache memory. If the data is not in the cache memory, a cache miss results and a lower level in the memory hierarchy must be accessed. A cache memory that maintains a cached set of memory locations approximating the set of most recently accessed memory locations is a historical cache memory.

Data cache misses can account for a significant portion of an application program's execution time. This is particularly true of scientific, graphic, or multimedia applications which are data bandwidth intensive running on high frequency processors with comparatively long memory latencies. With an increasing mismatch between processor and memory speeds, the penalty for cache misses has become a dominant performance limiting factor in system performance.

Various techniques have been employed to improve cache performance, i.e., to reduce cache miss ratios, over that provided by historical cache memory. One such technique is prefetching, i.e., fetching data (or instructions) into the cache before they are needed by the program. Prefetching involves fetching (from lower levels in the memory hierarchy and into the cache memory) of data not yet accessed by the processor with the expectation that the processor will do so and will be better able to use the prefetched data than the data replaced to make room for the prefetched data. A cache memory which prefetches data is a predictive cache memory. By anticipating processor access patterns, prefetching helps to reduce cache miss rates.

The effectiveness of prefetching is limited by the ability of a particular prefetching method to predict addresses from which the processor will need to access data. Hardware prefetching methods typically seek to take advantage of patterns in memory accesses by observing all, or a particular subset of, memory transactions and prefetching as yet unaccessed data for anticipated memory accesses. Memory transactions observed can include read and/or write accesses or cache miss transactions.

An example of a family of prefetching methods is the stream buffer predictor family. A stream buffer predictor generally uses hardware to observe memory transactions associated with cache misses and prefetches data (typically on a cache line basis) based on the observed pattern of cache misses. For example, while the missed cache line is fetched, the stream buffer predictor will prefetch data for the next sequential cache line or set of cache lines because memory is often accessed in address order. When a processor accesses data in the stream and there is a cache miss, the cache memory will first check the stream buffer before going to a lower level cache or main memory. Another example of a family of prefetching methods is the load stride predictor family. A load stride predictor generally uses hardware to observe processor memory accesses to the cache and looks for patterns upon which to base predictions of addresses from which the processor will need data. For example, based on a memory read access by the processor and on a set of past memory accesses, a load stride predictor predicts the address(es) of additional data to be accessed by a current program sequence executing on the processor. Such a prediction triggers a prefetch of associated data, which is then available to satisfy a cache miss if the prediction was correct.

Unfortunately, hardware prefetch techniques may not be particularly predictive of memory access patterns. This is particularly true in the case of applications that manipulate large data structures for which the next data access may not be an adjacent cache line to that previously accessed and for which memory access patterns cannot be said to stride at a fixed regular offset through memory address. Large linked list and other dynamically allocated data structures are particularly problematic for such predictive methods.

An alternative to hardware prefetching is to let a compiler generate "prefetch instructions" to request data before it is needed by the main computation. In theory, software prefetching techniques allow predictions of future memory access patterns to be informed by actual execution of the software. For example, an executing program will often have, or be able to compute, a pointer to subsequently addressed data structure elements. Compiler techniques for generating prefetch instructions are extensively detailed in Todd C. Mowry, *Tolerating Latency Through Software-Controlled Data Prefetching*, Ph.D. dissertation, Dept. of Electrical Engineering, Stanford University, March 1994. Mowry provides an extensive analysis of compiler generated prefetch algorithms and simulation results. See also U.S. Pat. No. 5,704,053 Santhanam, issued Dec. 30, 1997. In addition, Mowry describes basic architectural support for prefetching including the definition of a non-bonding, non-blocking, non-excepting prefetch instruction. See Mowry, Architectural Issues, pp. 121–190.

Unfortunately, while the software prefetching literature generally assumes the existence of a non-blocking, non-faulting prefetch or load instruction, descriptions of actual processor implementations thereof are lacking. Several modern processor architectures, e.g., the PowerPC™ Microprocessor (available from Motorola and International Business Machines Corp.), the Alpha AXP™ Microprocessor (available from Digital Equipment Corporation), and the MIPS R10000 Microprocessor (available from Silicon Graphics), define non-faulting prefetch instructions.

For example, the PowerPC™ architecture defines dcbt and dcbtst instructions to act as software initiated prefetch hints. See generally Motorola Inc., *PowerPC™ Microprocessor family: The Programming Environments*, pp.4-64–4-68, 5-8–5-11, and 8-50–8-51, Motorola Inc., G522-0290-00, Rev. 1, January 1997. Prefetch mechanisms to support the instructions are not described.

The Alpha AXP™ architecture defines FETCH and FETCH_M instructions that are also prefetch hints and which may or may not be implemented by a particular implementation. See generally, Digital Equipment Corporation, *Alpha Architecture Handbook,* EC-QD2KB-TE, pp. 4-138–4-139, A-10–A-11, October 1996. Again, underlying prefetch mechanisms to support the instructions are not described.

Finally, the MIPS IV architecture defines PREF and PREFX instructions that are again advisory and again which may or may not be implemented in a particular implementation. See generally, MIPS Technologies, Inc., *MIPS IV Instruction Set,* Revision 3.2, pp. A-10–A-11, and A-116–A-118 (September 1995). Again, underlying prefetch mechanisms to support the instructions are not described.

While neither the processors, nor their associated instruction sets are necessarily prior art with respect to the present invention, underlying prefetch mechanisms are needed to allow processors to actually implement the prefetch instructions assumed by the software prefetching literature and defined in the various instruction sets described above.

SUMMARY OF THE INVENTION

Accordingly, a prefetch instruction mechanism is desired for implementing a prefetch instruction which is non-faulting, non-blocking, and non-modifying of architectural register state. Advantageously, a prefetch mechanism described herein is provided largely without the addition of substantial complexity to a load execution unit. In one embodiment, the non-faulting attribute of the prefetch mechanism is provided though use of a vector-decode-supplied Op sequence that activates an alternate exception handler. The non-modifying of architectural register state attribute is provided (in an exemplary embodiment) by first decoding a PREFETCH instruction to an Op sequence targeting a scratch register wherein the scratch register has scope limited to the Op sequence corresponding to the PREFETCH instruction. Although described in the context of a vector decode embodiment, the prefetch mechanism can be implemented with hardware decoders and suitable modifications to decode paths will be appreciated by those of skill in the art based on the description herein. Similarly, although in one particular embodiment such a scratch register is architecturally defined to read as a NULL (or zero) value, any target for the Op sequence that is not part of the architectural state of the processor would also be suitable. Finally, in one embodiment the non-blocking attribute is provided by the Op sequence completing (without waiting for return of fill data) upon posting of a cache fill request to load logic of a data cache. In this way, LdOps which follow in a load pipe are not stalled by a prefetch-related miss and can instead execute concurrently with the prefetch-related line fill.

In one embodiment, a method of operating a processor in response to a prefetch instruction includes decoding the prefetch instruction; in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
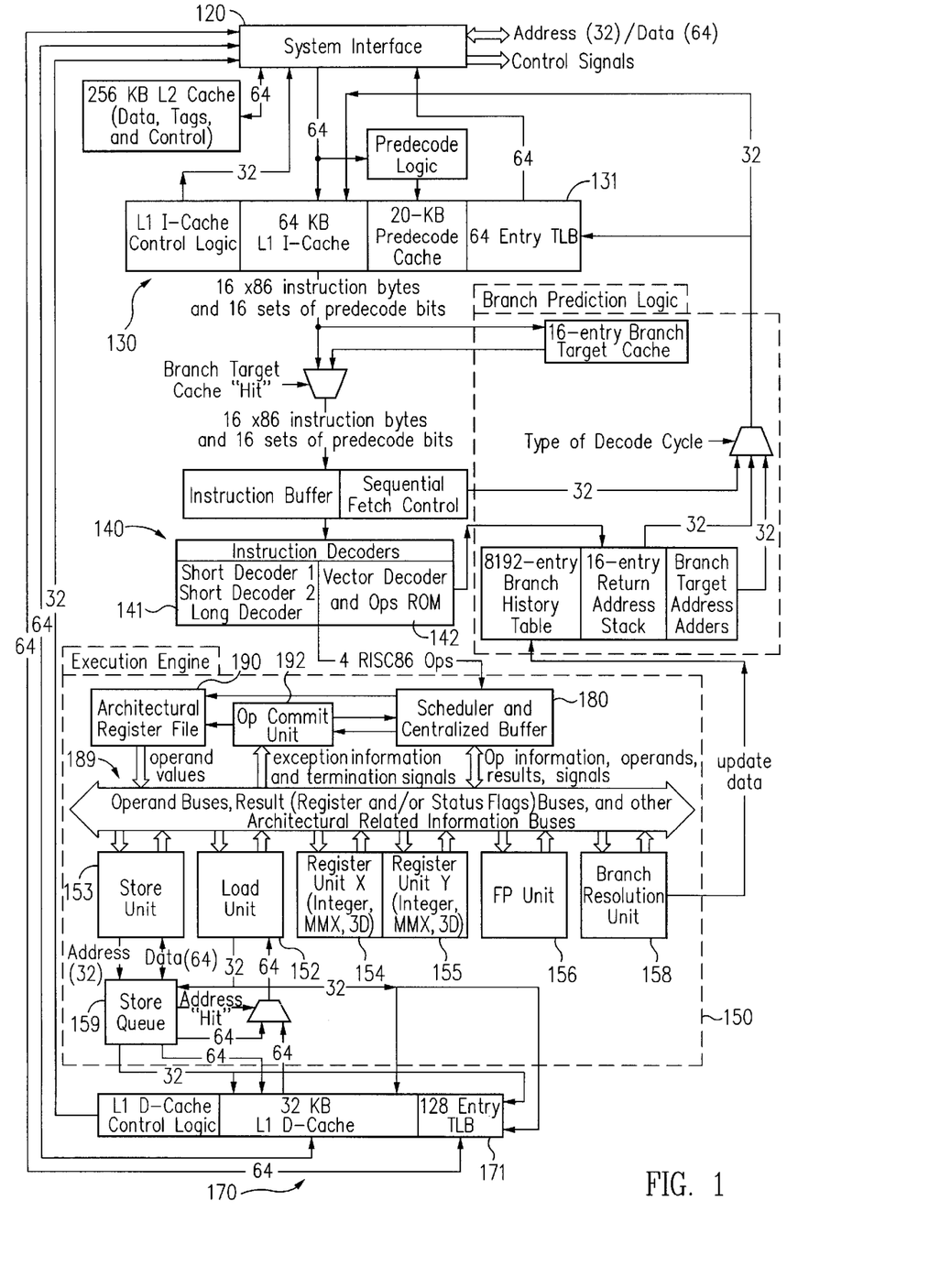
FIG. 1 is a block diagram of a processor including a prefetch instruction mechanism in accordance with an embodiment of the present invention.

FIG. 1 depicts an exemplary x86 instruction set compatible integrated circuit microprocessor 100 in accordance with an embodiment of the present invention. Instruction sequences are loaded from the memory subsystem into instruction cache 130 for anticipated execution by execution engine 150. Instructions in instruction cache 130 include CISC instructions selected from a complex instruction set such as the x86 instruction set implemented by processors conforming to the x86 processor architecture. Instruction decoder 140 converts CISC instructions received from instruction cache 130 to operations for execution engine 150. In the embodiment of FIG. 1, these operations are RISC-like operations (hereafter Ops) and a single x86 instruction from instruction cache 130 decodes into one or more Ops for execution engine 150. Individual Ops fall into one of several type groups including register operations (RegOps), load-store operations (LdStOps), load immediate value operations (LIMMOps), special operations (SpecOps), and floating point operations (FpOps). Alternative embodiments may decode different instruction sets and supply different operation types for execution.

Instruction decoder 140 includes two instruction translation portions, a hardware translation portion 141 and a ROM-based translation portion 142. Most common x86 instructions are translated into short sequences of 1 to 4 Ops using multiple parallel hardware decoders included in hardware translation portion 141. Hardware translation portion 141 decodes these common x86 instructions received from instruction cache 130 into short sequences of Ops that are then supplied to scheduler 180. Less common x86 instructions and those x86 instructions which translate into Op sequences longer than 4 Ops are translated by a ROM-based translation portion 142 which fetches (from ROM) a translated sequence of Ops corresponding to the particular x86 instruction to be translated. Translated Op sequences from either source, whether generated by hardware decoders or fetched from ROM, are supplied to scheduler 180 for execution by execution engine 150.

Figure 2:
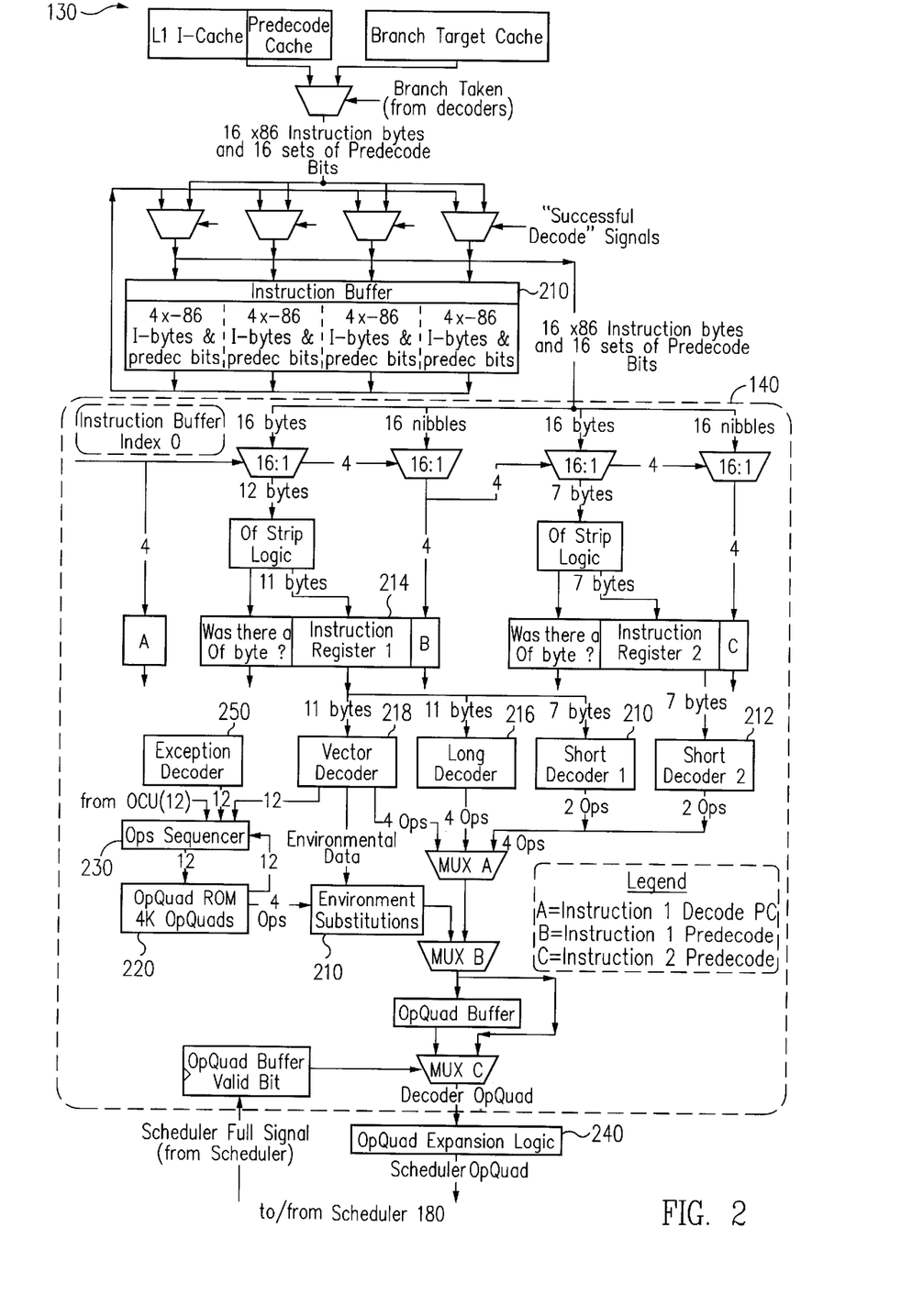
FIG. 2 is a block diagram of an instruction decoder including a decode paths in accordance with an embodiment of the present invention.

FIG. 2 depicts the various decode paths provided by instruction decoder 140. Instruction decoder 140 accepts x86 instruction bytes and associated predecode bits from instruction cache 130 (via instruction buffer 210), locates instruction boundaries amongst the x86 instructions, and generates Ops for execution by execution engine 150 (see FIG. 1) from these x86 instructions. Instruction decoder 140 decodes multiple x86 instructions per clock although single instruction per clock embodiments in accordance with the present invention are also suitable. In an exemplary embodiment, Ops are fixed format, RISC-like internal instructions which are combined to perform every function of the x86 instruction set. Some x86 instructions are decoded into as few as zero Ops—for example a NOP—or one Op—for example a register-to-register add. More complex instructions are decoded by instruction decoder 140 into several Ops.

Instruction decoder 140 employs a combination of decoders to convert x86 instructions into Ops. In particular, instruction decoder 140 includes three sets of decoders—two parallel short decoders 210 and 212, one long decoder 216, and one vector decoder 218. Parallel short decoders 210 and 212 translate the most commonly-used x86 instructions (e.g., moves, shifts, branches, ALU, MMX, and FPU instructions) into zero, one or two Ops each. In the embodiment of FIG. 2, parallel short decoders 210 and 212 operate on x86 instructions that are up to seven bytes in length (for example, including sib and mod r/m bytes etc.) and together decode up to two x86 instructions per clock.

Commonly used x86 instructions that are greater than seven bytes but not more than 11 bytes in length as well as some less commonly used x86 instructions up to seven bytes in length are handled by long decoder 216. Long decoder 216 performs one decode per clock and generates up to four corresponding Ops.

Other translations (e.g., complex instructions, serializing instructions, interrupts, exceptions, etc.) are handled by a combination of the vector decoder 218 and Op sequences fetched from ROM 220. Prefetch instructions are also handled by vector decoder 218 and ROM 220. Vector decoder 216 provides a first set of Ops and a vector (i.e., an initial ROM address) to a sequence of further Ops. Ops fetched from ROM 220, like those decoded by short decoders 210 and 212 and long decoder 216, are fixed format, RISC-like internal instructions which are combined to perform the functions of corresponding decoded instruction, e.g., the prefetch instruction. In the embodiment of FIG. 2, although short decoders 210 and 212, long decoder 216, and vector decoder 218 each receive a copy of instruction buffer 210 contents for decode, only one of the three types of decoders is used during a particular decode clock.

Referring now to FIG. 2, instruction decoder 140 generates a group of four Ops for scheduler 180. For decodes that would not otherwise fill the entire group with four Ops, NOOP Ops are used to pad the group of Ops sent to scheduler 180. Up to six groups, or 24 Ops, can be placed into scheduler 180 at a time.

Focusing on the decode path associated with vector decoder 218, x86 instructions that are not handled by either the two parallel short decoders (210 and 212) or the long decoder 216 are handled by a vector decode path that includes vector decoder 218, OpQuad ROM 220, and Ops sequencer 230. In general, vector decodes are started by vector decoder 218 and completed by Op sequences fetched from the OpQuad ROM 220. Vector decoder 218 provides:

1. an initial set of up to four (4) Ops to initiate execution of the decoded instruction (this initial OpQuad is referred to as the vectoring OpQuad); and 2. a vector (or entry point address) to a sequence of additional Ops stored in OpQuad ROM 220.

In a presently preferred embodiment, Ops stored in OpQuad ROM 220 and supplied as part of a vector decode are of identical type to those supplied from hardware decoders (210, 212, and 216). However, in alternative embodiments, the Ops stored in OpQuad ROM 220 could be of a different type than those supplied from the hardware decoders.

An OpQuad passes through the OpQuad expansion logic 240 on its way to scheduler 180. To distinguish between OpQuads as initially produced by the decoders and OpQuads as later supplied by the OpQuad expansion logic 240, the two are referred to as decoder OpQuads and scheduler OpQuads, respectively. In an exemplary embodiment, a decoder OpQuad includes four 38-bit Ops to form a 152-bit OpQuad. A scheduler OpQuad, on the other hand, includes a variety static and dynamic fields totaling 578 bits, including fields that have been resolved and substituted into the scheduler OpQuad for supply to scheduler 180. OpQuads stored in OpQuad ROM 220 include the 152-bit decoder OpQuads together with an associated 14-bit sequencing field for use by Op Sequencer 230 in fetching additional decoder OpQuads from OpQuad ROM 220.

In general, instruction decoder 140 operates either in a "hardware decoders are active" state or an "OpQuad ROM fetch is active" state. Whenever the instruction decoder 140 is the "OpQuad ROM fetch is active" state, it will remain in such state until the last OpQuad in the OpQuad sequence has completed processing and thereupon transition to the "hardware decoders are active" state. In one embodiment, the last OpQuad is identified by a value in the sequencing field of a decoder OpQuad. Instruction decoder 140 remains in the "hardware decoders are active" state until a conditions arises, such as a vector decode or an exception, that requires an OpQuad sequence to be fetched from OpQuad ROM 220.

Operation of the vector decode path is now described in greater detail with reference to FIG. 3. Vector decoder 218 supplies (1) an initial decoder OpQuad and (2) an entry point address for an OpQuad sequence in OpQuad ROM 220. This OpQuad sequence includes a sequence of OpQuad templates. Environment substitutions logic 210 processes fields from the OpQuad templates and, in turn, supplies decoder OpQuads in accordance with an OpQuad sequence execution environment represented in environment registers 320. Environment registers 320 include storage for variables representing default address and data sizes for the code segment and register numbers from the x86 instruction being decoded. These environment variables allow a section of an OpQuad sequence to be used for multiple x86 instructions by substituting field values in a common OpQuad sequence with environment variables appropriate for the code section and particular x86 instruction. Such common OpQuad sequences may also include Ops not necessary for the implementation of the particular x86 instruction being decoded. Such Ops are replaced by NoOps in Force Leading NoOps logic 330. Use of the substituted environment variables allows encoding of x86 instruction set architecture functionality while substantially reducing the number and size of the code sequences in OpQuad ROM 220.

Exception vector decoder 250 and Op Commit Unit 192 also produce entry point addresses into OpQuad ROM 220, but (unlike vector decoder 218) do not produce an initial vectoring OpQuad. Coincident with an abort cycle, Op Commit Unit 192 vectors to one of two possible OpQuad sequence entry point addresses—either the "default" OCU fault handler address or an "alternate" OCU handler. Setup of these addresses is supported by the LDDHA Op (load default handler address) and the LDAHA Op (load alternate handler address). The default fault handler address is initialized by a processor reset OpQuad sequence and the alternate handler address is specified within OpQuad sequences corresponding to some x86 instructions and for some cases of exception processing. For example, in one embodiment, the LDAHA Op is used in an OpQuad sequence corresponding to the PREFETCH instruction.

Upon execution of a LDAHA Op, the specified alternate handler address is stored in alternate handler address register 351 and a current handler address is supplied (on a fault condition) from alternate handler address register 351. Alternate handler address register 351 remains "active" until the end of the current instruction or exception processing OpQuad sequence, i.e., until Op Commit Unit 192 detects a last Op in the current OpQuad sequence. At this point, the active handler address reverts to that stored in default handler address register 352.

Initial OpQuad generation logic 322 supplies an initial four Ops during a vector decode cycle in parallel with generation of an OpQuad ROM 220 entry point address. During successive clock cycles, additional OpQuads are supplied from OpQuad ROM 220. The initial OpQuad varies depending on the instruction or exception handling implemented. In general (e.g., for the register and for the memory forms of x86 mod R/M instructions), the Ops in the initial OpQuad primarily serve to set up immediate displacement, and/or effective memory address values in scratch integer registers via LIMM (load immediate) Ops. The fourth Op in the initial OpQuad typically encodes the address of a next sequential instruction.

Referring again to FIG. 1, execution engine 150 includes a scheduler 180, a register file 190, and multiple execution units that receive and execute Ops dispatched by scheduler 180. In the embodiment of FIG. 1, execution engine 150 includes seven execution units: load unit 152, store unit 153, register units 154 and 155, floating point unit 156, multimedia unit 157, and a branch unit 158, although alternative embodiments may add to or subtract from the set of execution units. Execution engine 150 also includes a store queue 159 interposed between store unit 153 and data cache 170.

Scheduler 180 is organized as an ordered array of storage entries and logic blocks coupled thereto, which together provide support for out-of-order dispatch of Ops to execution units and for forwarding of Op results to one or more execution units. The ordered array of storage entries and logic blocks also implements a reorder buffer and provides for renaming of the architectural registers defined in register file 190 and speculative execution recovery. Instruction decoder 140 supplies scheduler 180 with new Ops decoded from the instruction stream, as described above. In turn, scheduler 180 stores and maintains (in a storage entry) data associated with each new Op received. In this way scheduler 180 tracks the status of each Op and its associated data as the Op is issued to, and executed by, an execution unit. After a given Op is fully executed and data dependencies have been resolved, it is retired and the corresponding scheduler entry is released. Op commit unit 192 manages Op retirement.

Scheduler 180 is coupled to execution units (i.e., load unit 152, store unit 153, register units 154 and 155, floating point unit 156, multimedia unit 157, and branch unit 158) via a group of busses and control lines collectively shown as a bus 189. Scheduler 180 supplies Ops, register operands, and control signals to the execution units and receives result values and status indications back from the execution units, illustratively via bus 189. Of course, all busses and control lines need not be fully connected and bus 189 is merely illustrative of the bidirectional coupling of scheduler 180 with the execution units.

Scheduler 180 retains result values until Op Commit Unit 192 determines that no exception and no mispredicted branch precedes the associated operation. After execution of an abortable operation, the results of the operation are kept in the associated scheduler entry and/or in store queue 159. If Op Commit Unit 192 determines that the oldest executed operations would be generated in a sequential execution of the program, the results are made permanent (or are committed) by writing them to register file 190, to a status register, to cache, or to memory as appropriate. If the Op Commit Unit 192 determines that a result would not be generated in a sequential execution of the program, e.g., due to an exception or mispredicted branch, the Op is retired without making permanent changes. Op Commit Unit 192 resets the fault handler address source to default handler address register 351 (see FIG. 3) on retirement of the last OpQuad associated with a current x86 instruction.

Load unit 152 and store unit 153 execute LdStOps, respectively loading data from and storing data to addressable memory. Depending on the caching state of a particular memory address, a LdStOp may complete at the L1 data cache 170, at an L2 cache (not shown), or at main memory (also not shown). Store queue 159 temporarily stores data from store unit 153 so that store unit 153 and load unit 152 can operate in parallel without conflicting accesses to data cache 170. Register units 154 and 155 execute RegOps that operate on a data associated with the architectural registers of register file 190.

LdStOps, i.e., LdOps and StOps, have two execution stages, during which address calculation, segment and page translation (and protection checking), and data cache accessing (in the case of LdOps) all take place. Unlike RegOps, LdStOps can be held up for arbitrary periods of time in either the first or the second stage, although most hold ups appear in the second stage. Most commonly, hold ups in the second stage result from data cache 170 misses, data TLB 171 misses, and page faults. Hold ups in the first stage result from misaligned memory references and from the second stage of the corresponding load or store unit being occupied and blocked by a LdOp or StOp not advancing to completion. Handling of LdStOps is described in greater detail in a co-pending U.S. patent application Ser. No. 09/040,087, entitled "Scan Chains for Out-of-Order Load/Store Execution Control," naming Favor et al. as inventors and filed Mar. 17, 1998, the entirety of which is hereby incorporated by reference.

In addition to the generalized LdOps described above and in the above incorporated co-pending patent application, load unit 152 also executes a non-blocking Load Prefetch Op (LDPF) that loads an addressed cached line into data cache 170 without modifying architectural register state. Data cache 170 or data TLB 171 misses encountered by the LDPF Op are serviced before a subsequent LdOp or Stop accesses the addressed cache line. In this way, a compiler generated prefetch (PREFETCH) instruction which decodes (e.g., via the vector decode path described above) to an Op sequence including a LDPF Op allows processor 100 to hide latency associated with a data cache 170 or data TLB 171 miss that would otherwise have been incurred by the LdOp or StOp.

Load unit 152 interfaces with data cache 170 as shown in FIG. 1. Load unit 152 performs address calculations and mappings for a load address and, on a hit in data cache 170, receives addressed data from data cache 170 for supply to scheduler 180 via busses 189. In the embodiment of FIG. 1, result values (including LdOp results) are stored in destval fields of corresponding Op entries in scheduler 180 and are committed to register file 190 by Op Commit Unit 192 upon retirement of the corresponding OpQuad. For LdOps other than the LDPF Op, a miss in data cache 170 stalls load unit 152. In contrast, a LDPF Op completes whether or not the LDPF Op hits or misses in data cache 170. If the LDPF Op hits, addressed data is supplied to scheduler 180 as described above. If the LDPF Op misses, "garbage" data from the cache data bus is supplied to scheduler 180 for storage in a destval field and eventual commitment to a register target, e.g., in register file 190. In one embodiment, the scratch register target is a microcode scratch register, T0, that is achitecturally defined to always supply NULL (or zero) data. In other embodiments, the scratch register target is a microcode scratch register having scope limited to a current instruction or corresponding OpQuad sequence.

Load unit 152 does not wait for data cache 170 to service a cache miss triggered by a LDPF Op. Since the LDPF Op completes, load unit 152 does not continue to present the LDPF Op address to data cache 170. Therefore, when the cache fill request is eventually serviced, the addressed data is filled into data cache 170 but is not supplied to the register target of the original LDPF Op.

Prefetch Instruction Operation

The above-described CISC-to-RISC instruction decode mechanism and multiple execution unit execution engine 150 are utilized to implement a prefetch instruction which is non-faulting, non-blocking, and non-modifying of architectural register state. By utilizing the vector decode path of instruction decoder 140, only the non-blocking attributes of a Load Prefetch (LDPF) operation need be provided in load unit 152. Non-faulting and non-modifying of architectural register state attributes are advantageously provided by normal operation of the vector decode path described above with suitable OpQuad ROM contents. In an exemplary processor in accordance with the present invention, a prefetch instruction PREFETCH (e.g., a prefetch instruction extension to the x86 instruction set that is generated by a compiler and inserted in an instruction sequence to improve latency tolerance using software controlled prefetching) is decoded by the vector decode path to provide an Op sequence from ROM 220 which includes a Load Alternate Handler Address (LDAHA) Op and a LDPF Op.

In an exemplary embodiment, the prefetch instruction (PREFETCH) is actually a set of instructions corresponding to different flavors of prefetch behavior and/or handling. An exemplary instruction format is as follows:

0F 0D modr/m [sib] [disp]

where 0F 0D encodes the PREFETCH instruction and where only the memory form of the instruction is valid. Use of the register form results in an Invalid Opcode exception. The logical address target of the prefetch is computed normally (i.e., using a base register register value, an index register value with scaling factor, and a displacement value), mapped to a linear address and then into physical address space to specify a 32 Byte cache line for prefetch. The physical prefetch address is interpreted as a byte address, rather than as an operand-sized address so that the physical address corresponds to a single cache line. Alternative embodiments may prefetch larger or smaller cache lines and may optionally prefetch additional (e.g., subsequent) cache lines.

If a memory fault is caused by execution of a LDPF Op decoded from the PREFETCH instruction, the fault (or virtual memory exception) is ignored and the instruction simply behaves as a NOOP. If a miss occurs in TLB 171, a TLB fill is attempted (in hopes of being able to successfully perform the prefetch). Alternative embodiments may optionally forgo the TLB fill and again behave as a NOOP. Once the logical-to-physical address translation is complete, tag arrays of data cache 170 are accessed. If a cache hit occurs in data cache 170 (with any MESI state), the LDPF Op behaves as a NOOP. However, if a cache miss occurs, a cache fill request is posted. In either case, no architecturally visible register or status flags are modified by execution of the LDPF Op decoded from the PREFETCH instruction.

Since there is not a destination register for the PREFETCH instruction, the "reg" field of the modr/m byte is not used. Instead, this field is used in some embodiments to encode a sub-opcode which distinguishes between up to eight flavors of prefetch. Presently, only the sub-opcode 'b000 (sub-opcode 0) is defined for the processor of FIG. 1. However, other processor embodiments incorporating the prefetch instruction mechanism described herein may define sub-opcodes to encode expected usage of the prefetched data (e.g., once or multiple accesses, for read access or write access, etc.) or size or type of prefetch (e.g., single- or multiple-cache line prefetch, prefetch to data cache or to prefetch buffer, etc.).

Figure 3:
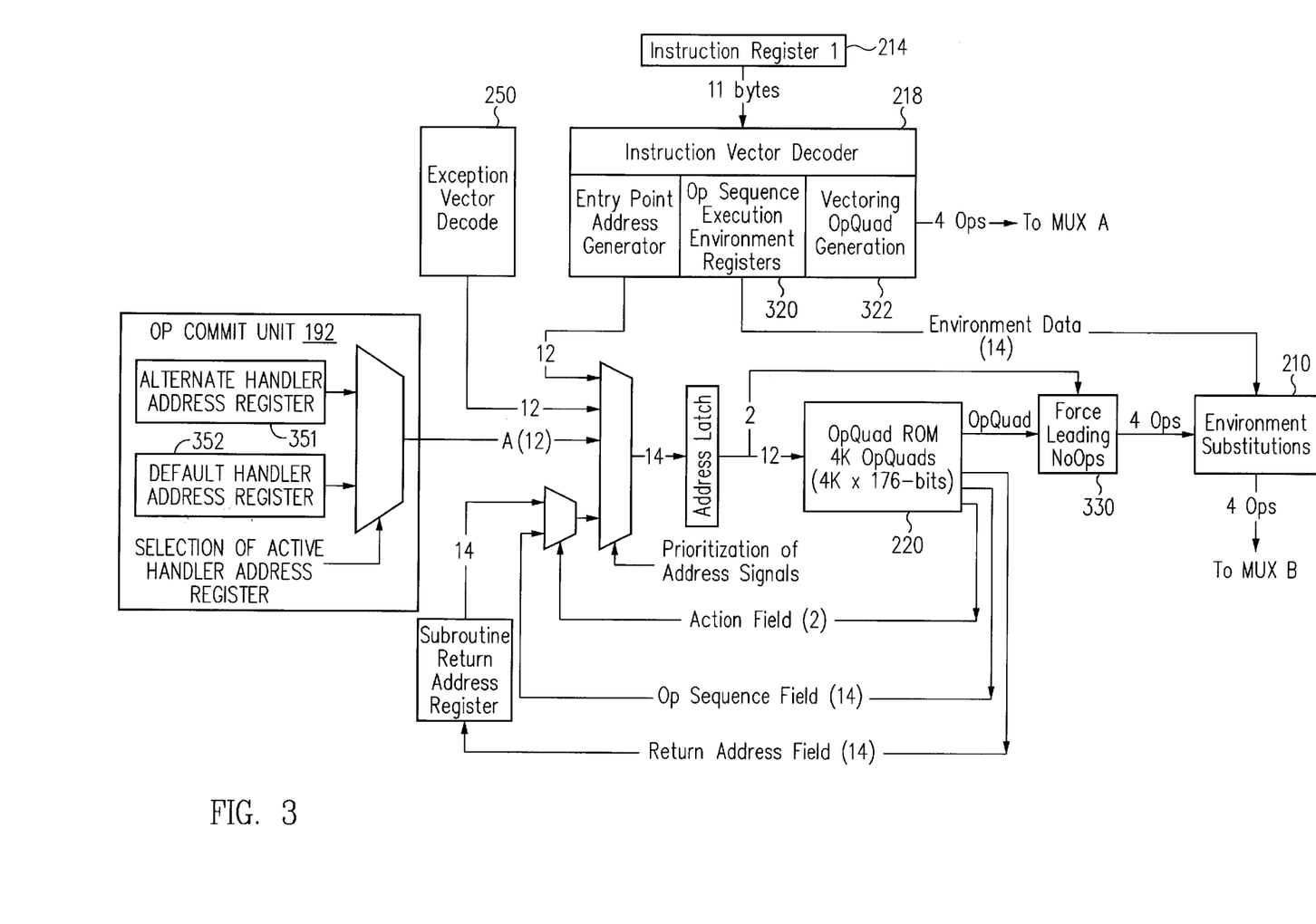
FIG. 3 is a block diagram of a vector decode path adapted to provide a prefetch instruction mechanism in accordance with an embodiment of the present invention.
Figure 4A:
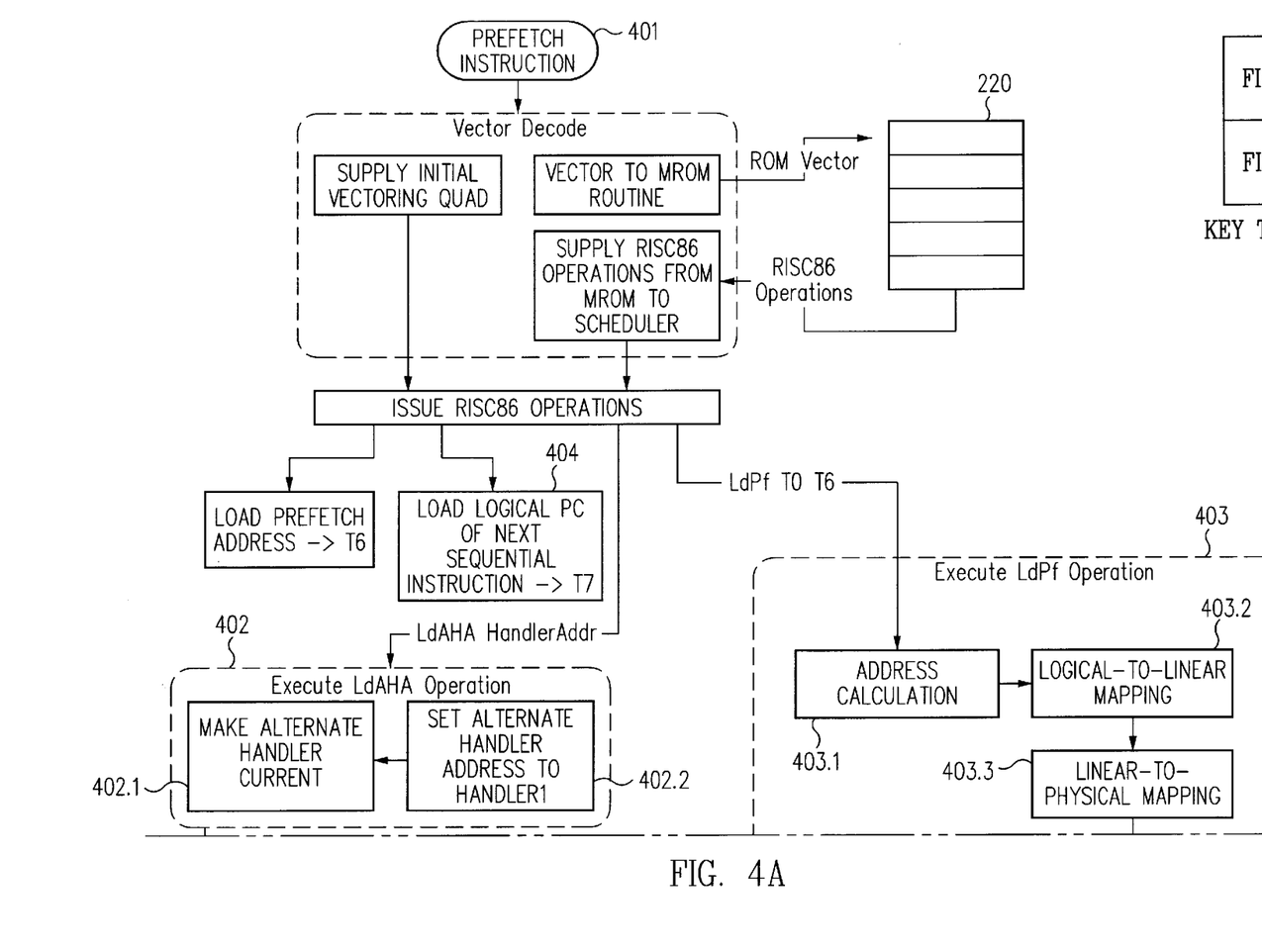
FIG. 4 is a flow chart depicting operation of a prefetch instruction mechanism for providing, in accordance with an embodiment of the present invention, a prefetch instruction which is non-faulting, non-blocking, and non-modifying of architectural register state.
Figure 4B:
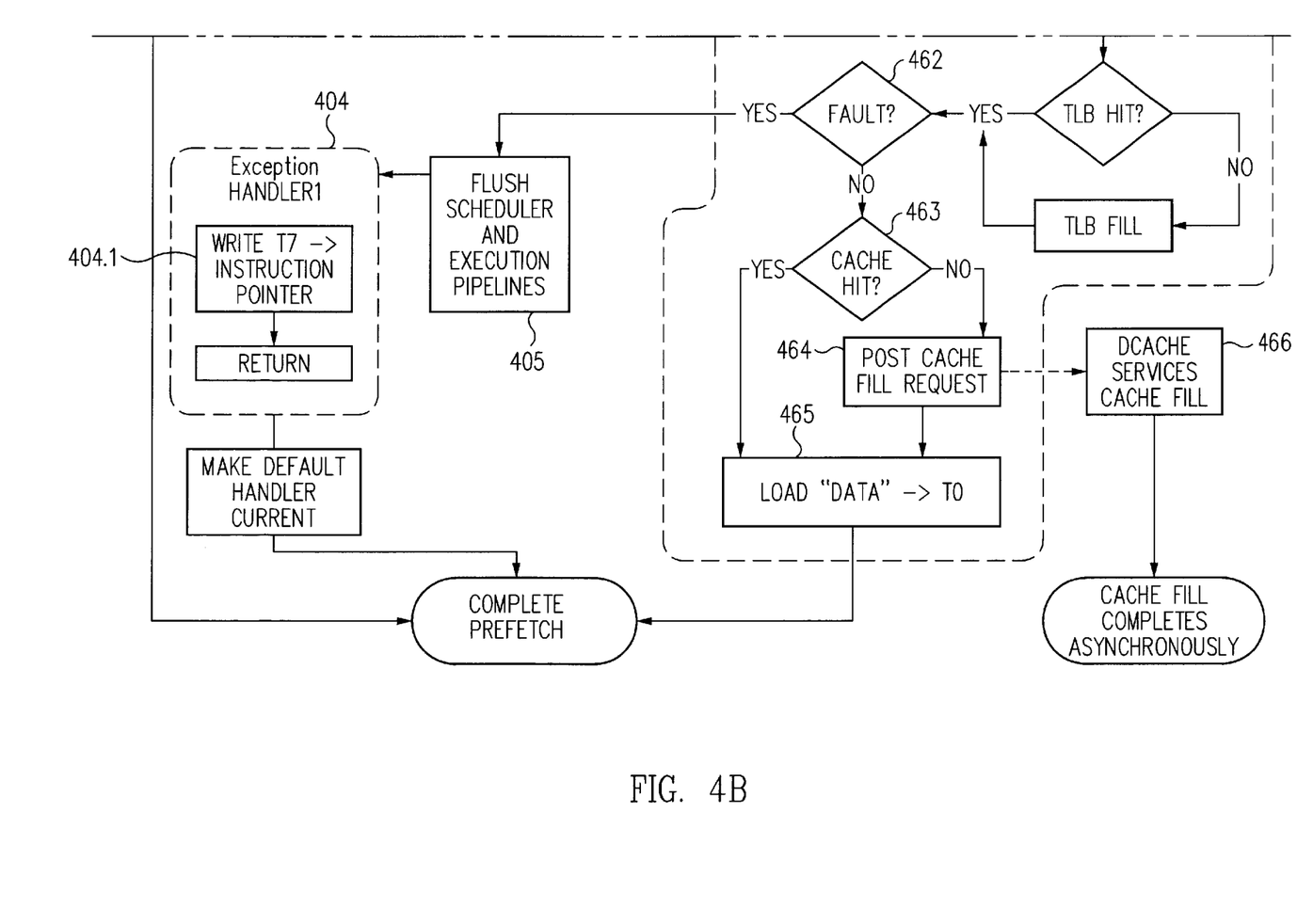

FIG. 4 depicts operation of a prefetch mechanism for implementing a prefetch instruction (PREFETCH) 401 on processor 100 in accordance with an embodiment of the present invention. When a PREFETCH instruction is detected in an instruction stream by vector decoder 218, the decoder vectors to an instruction emulation (or microcode) routine in OpQuad ROM 220. An initial vectoring OpQuad is supplied from vectoring OpQuad Generator 322 (see FIG. 3) and an Op sequence (encoded as a single OpQuad in an exemplary embodiment) is supplied from OpQuad ROM 220 under control of sequencer 230 as described above. The Op sequence includes at least a load alternate handler address (LDAHA) Op and a prefetch (LDPF) Op. In the embodiment of FIG. 1, the LDAHA Op 402 is performed by Op Commit Unit 192 while the LDPF Op 403 is executed by load unit 152 respectively, although other execution unit configurations are possible. More specifically, an exemplary single OpQuad Op sequence includes:

```
PREFETCH {
    LDAHA SeqEret
    LDPF.b→@(t6,05).a
    NOOP
    NOOP
    ERET}
``` where SeqEret is a label specifying an exception handler, where .b specifies a data size of byte data, where _ is a synonym for microcode scratch register t0, where @(t6) identifies the prefetch address (specifying a base=0, index=0, and displacement=0 address calculation based on contents of microcode scratch register t6), and where os is an indirect specifier for the operand segment associated with the current x86 instruction being decoded by vector decoder 142. The .a encoding specifies an address calculation size. Two NOOPs pad the single OpQuad Op sequence and ERET encodes a return Op sequence field (or last OpQuad mark). In an alternative embodiment, an OpQuad containing the LDAHA and LDPF Ops is supplied from a hardware decoder.

A initial vectoring OpQuad corresponding to the vector decoder embodiment described above includes Ops to setup microcode scratch registers. In particular, initial vectoring OpQuad includes an LEA (load effective address) OP to load microcode scratch register t6 with the PREFETCH address and an Op or Ops (e.g., a LIMM Op) to load an instruction pointer value (logical address value) corresponding to the next sequential x86 instruction into load microcode scratch register t7.

As described above, microcode scratch registers are defined in register file 190. These microcode scratch registers (including t0, t6, and t7) are not part of the architecturally visible state and, in the embodiment of FIG. 1, have a scope limited to a given vector decode supplied Op sequence. Emulation code scratch register to is a special scratch register defined to return a state independent of any prior emulation code operations thereon. In one embodiment, emulation code scratch register t0 always supplies a zero (0) or NULL state.

Two handler address registers, a default handler address register 352 and an alternate handler address register 351, are maintained by Op Commit Unit 192 (see FIG. 3). Normally, the default handler address register 352 is active and determines the handler (encoded as an Op sequence in OpQuad ROM 220) invoke on a fault condition. If activated by an LDAHA Op, alternate handler address register 351 instead supplies the fault handling vector into OpQuad ROM 220. Alternate handler address register 351 remains active only during Op sequence containing the LDAHA Op that activated it. Thereafter, the default handler address register 351 is active, unless another LDAHA Op follows. Although the above-described, vector-decode-supplied Op sequence modifies microcode scratch registers and contents of the alternate handler address register, no architecturally visible registers are modified thereby.

The vector-decode-supplied Op sequence is now described focusing first on the LDAHA Op. The LDAHA Op sets (402.2) alternate handler address register 351 state to point to an exception handler such as exception handler 404 and makes (402.2) the handler identified by alternate handler address register 351 the active fault handler. Exception handler 404 is invoked on fault conditions (e.g., at fault 462) such as a virtual memory exception, segmentation violation, or page fault.

An exemplary exception handler 404 is as follows:
HANDLER1 {
  WRIP _,_,t7
  ERET
}
where hander1 is implemented as Ops from OpQuad ROM 220 and where alternate handler address register 351 is active and identifies the corresponding emulation code entry point thereinto. The WRIP Op writes (404.1) the value from microcode scratch register t7 to the instruction pointer of processor 100 so that execution can continue with the next sequential x86 instruction. Recall that the initial vectoring OpQuad included an Op or Ops (404) to load an instruction pointer value (logical address value) corresponding to the next sequential x86 instruction into microcode scratch register t7. Note that in the exemplary embodiment of FIG. 4, Op Commit Unit 192, which detects and acts upon pending fault 462, flushes (405) scheduler 180 and the execution pipelines of processor 100.

Because alternate handler address register 351 is active only during the particular vector decode supplied Op sequence that caused execution 402 of the LDAHA Op, handler1 negates normal fault handling only for execution of the Op sequence implementing prefetch instruction 401. In some embodiments, the vector-decode-supplied Op sequence may explicitly reset handler address register 450 to identify a normal handler. However, in the exemplary embodiment of FIG. 4, Op Commit Unit 192 makes (406) the default handler address register 352 active on retirement of the last OpQuad in the Op Sequence corresponding to the PREFETCH instruction.

Turning now to execution (403) of the LDPF Op, a LDPF targeting microcode scratch register t0 is supplied to load unit 152. In a first stage of load unit 152, address calculations are performed (403.1) using the logical address value previously stored in microcode scratch register t6. In the exemplary OpQuad described above, the address translation is trivial (t6+0*scaling+0). The logical-to-linear segmentation mapping is performed (403.2) by adding the segment base to the logical address. A linear-to-physical address mapping (403.3) is attempted using the translation lookaside buffer (TLB) 171 stored in data cache 170. Any fault condition (462) such as a virtual memory exception, segmentation violation, or page fault triggers the fault handler identified by the active one of the alternate and default handler address registers. For the reasons described above, alternate handler address register 351 is active and HANDLER1 404 is invoked.

If the translation is successful and no faults are generated, a tag lookup is performed in data cache 170. If the tag lookup (cache hit? 463) indicates a cache miss, a cache fill request is posted (464) to data cache 170. If the tag lookup hits in data cache 170, data is available for supply to the register target of the LDPF Op, namely microcode scratch register t0. In either case, the LDPF Op completes. For a cache miss, "garbage" data destined for microcode scratch register t0 is supplied (465) via the load unit result bus and a destval field in scheduler 180. For a cache hit, the data supplied (465) is valid, although alternative embodiments need not so provide as the data, valid or invalid, has microcode scratch register t0 as its target and, therefore, does not modify architectural state of processor 100.

As indicated in FIG. 4, the LDPF Op completes irrespective of cache hit/miss status. In the case of a cache miss, the LDPF Op completes upon posting (464) a cache fill request to data cache 170. The cache fill request is serviced (466) independent of (e.g., after) LDPF Op completion. In an exemplary embodiment in accordance with FIG. 1, a single cache fill request is buffered; however, other embodiments may buffer more fill requests. When the requested cache line is eventually filled to data cache 170 from a lower level in the memory hierarchy, PREFETCH instruction 401, including LDPF Op execution (403), has already completed.

The prefetch mechanism described herein supports a prefetch instruction which is non-faulting, non-blocking, and non-modifying of architectural register state. Advantageously, the support is provided largely without the addition of substantial complexity to load unit 152. In particular, the non-faulting attribute of the prefetch mechanism is provided though use of the vector decode supplied Op sequence (see above) which employs temporary use of an alternate exception handler such as exception handler 404. The non-modifying of architectural register state attribute is provided by first decoding the PREFETCH instruction 401 to an Op sequence targeting a scratch register where the scratch register (e.g., microcode scratch register t0) has scope limited to the Op sequence corresponding to the PREFETCH instruction. Although described in the context of a vector decode embodiment, the prefetch mechanism could be implemented with hardware decoders and suitable modifications to the decode paths will be appreciated by those of skill in the art based on the description herein. Similarly, although the exemplary scratch register (microcode scratch register t0) is architecturally defined to read as a NULL (or zero) value, any target for the LDPF Op that is not part of the architectural state of the processor would also be suitable. Finally, the non-blocking attribute is provided by the LDPF Op completing upon posting of a cache fill request to load logic of a data cache (e.g., data cache 170) without waiting for return of the fill data. As a result, LdOps which follow in a load pipe (e.g., in the pipe defined by load unit 152) are not stalled by a LDPF miss and instead execute concurrently (assuming the hit in cache 170)

with the prefetch-related line fill. Furthermore, because the LDPF Op completes immediately, the OpQuad(s) associated with the PREFETCH instruction can be retired by Op Commit Unit 192, thereby freeing scheduler 180 resources for additional OpQuads.

While the invention has been described with reference to various embodiments, it will be understood that these embodiments are illustrative and that the scope of the invention is not limited to them. Many variations, modifications, additions, and improvements of the embodiments described are possible. Structures and functionality presented as hardware in the exemplary embodiment may be implemented as software, firmware, or microcode in alternative embodiments. These and other variations, modifications, additions, and improvements may fall within the scope of the invention as defined in the claims which follow.

What is claimed is:

1. A method of operating a processor in response to a prefetch instruction, said method comprising:

decoding the prefetch instruction;

in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation, wherein the prefetch instruction is defined to be non-faulting, non-blocking and non-modifying of architectural register state; and wherein the method allows implementation of the prefetch instruction in a superscalar processor substantially without specialized architectural support therefor except for supply of a completion indication for the non-blocking load operation upon a corresponding cache hit or, in the case of a cache miss, upon posting of a corresponding cache fill request.

2. The method of claim 1, wherein state of the register is architecturally defined to be independent of any prior operation, such that no data dependency relation exists between the non-blocking load operation and any other operation.

3. A method of operating a processor in response to a prefetch instruction, said method comprising:

decoding the prefetch instruction;

in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation, wherein the non-blocking load operation is included in a micro-operation routine corresponding to the prefetch instruction; and wherein the non-blocking load operation targets a micro-operation scratch register, the micro-operation scratch register having scope limited to the micro-operation routine.

4. A method of operating a processor in response to a prefetch instruction, said method comprising:

decoding the prefetch instruction;

in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation, wherein, in the case of a cache miss, the non-blocking load operation completes upon posting of a corresponding cache fill request.

5. A method of operating a processor in response to a prefetch instruction, said method comprising:

decoding the prefetch instruction;

in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation, wherein the installing includes executing a load alternate handler address operation.

6. The method of claim 5, wherein state of the register is architecturally defined to be independent of any prior operation, such that no data dependency relation exists between the non-blocking load operation and any other operation.

7. An apparatus comprising:

at least one execution unit;

an instruction decoder coupled into an instruction stream to receive and decode a prefetch instruction and to supply said at least one execution unit with at least one operation corresponding to said prefetch instruction, said corresponding at least one operation including a non-blocking load operation targeting a non-architectural store;

an exception handler having scope limited to said at least one operation and non-responsive to a fault associated with execution of said at least one operation; and an exception handling mechanism supporting at least a two exception handling vectors, a first vector establishing correspondence between a fault condition and a normal handler therefor, and a second vector establishing correspondence between said fault condition and an alternate handler therefor, said alternate handler including said exception handler and said exception handling mechanism vectoring to said alternate handler in response to an occurrence of said fault condition in context of said at least one operation.

8. A method of operating a processor in response to a prefetch instruction, said method comprising:

decoding the prefetch instruction;

in response to the decoding, installing a fault handler that ignores at least virtual memory exceptions; and issuing a non-blocking load operation with a register target selected to ensure that no data dependency relation exists between the non-blocking load operation and any other instruction; and executing the non-blocking load operation, wherein the installing includes a load alternate handler address operation included in a micro-operation routine corresponding to the prefetch instruction; and wherein the load alternate handler address operation has scope limited to the micro-operation routine.

9. A method of operating a processor to implement a prefetch instruction, said method comprising:

decoding the prefetch instruction;

in response to the decoding,
installing a fault handler that ignores at least virtual memory exceptions; and
issuing a non-blocking load operation with a register target selected to ensure that no data dependency relation exists between the non-blocking load operation and any other instruction; and executing the non-blocking load operation, wherein the decoding includes issuing a sequence of microcode operations for execution by the processor, the sequence including a load alternate handler address operation and a non-blocking load operation targeting a microcode scratch register.

10. A method of providing prefetch instruction functionality in a processor, said method comprising:

defining at least one execution unit of said processor capable of executing a non-blocking load operation;

configuring an instruction decoder coupled into an instruction stream of said processor to receive and to decode said prefetch instruction and to supply at least one corresponding operation including an instance of said non-blocking load operation targeting a non-architectural store; and configuring an exception handler having scope limited to said at least one corresponding operation and non-responsive to a fault associated with execution of said non-blocking load operation instance, wherein, in addition to said non-blocking load operation instance, said at least one corresponding operation includes an operation to perform said exception handler configuring.

11. A method, as recited in claim 10, wherein said instruction decoder includes a vector decoder; and wherein said instruction decoder configuring includes defining said at least one corresponding operation in an operation store accessible to said vector decoder.

12. An apparatus comprising:

at least one execution unit;

an instruction decoder coupled into an instruction stream to receive and decode a prefetch instruction and to supply said at least one execution unit with at least one operation corresponding to said prefetch instruction, said corresponding at least one operation including a non-blocking load operation targeting a non-architectural store;

an exception handler having scope limited to said at least one operation and non-responsive to a fault associated with execution of said at least one operation;

a normal exception handler responsive to said fault; and wherein, in addition to non-blocking load operation, said corresponding at least one operation further includes an operation to associate said scope limited exception handler with said corresponding at least one operation.

13. An apparatus, as recited in claim 12, wherein said non-architectural store targeted by said non-blocking load operation includes a register having scope limited to said at least one operation.

14. An apparatus, as recited in claim 12, further comprising:

a memory hierarchy including a cache, wherein said a prefetch instruction encodes an address in said memory hierarchy and said non-blocking load operation causes data associated with said address to be loaded into said cache without modifying architectural register state.

15. An apparatus, as recited in claim 12, wherein said instruction decoder includes a vector decoder.

16. An apparatus, as recited in claim 12, wherein said instruction decoder includes a hardware decoder.

17. An apparatus, as recited in claim 12, implemented as a processor on an integrated circuit chip.

18. An apparatus comprising:

at least one execution unit;

an instruction decoder coupled into an instruction stream to receive and decode a prefetch instruction and to supply said at least one execution unit with at least one operation corresponding to said prefetch instruction, said corresponding at least one operation including a non-blocking load operation targeting a non-architectural store;

an exception handler having scope limited to said at least one operation and non-responsive to a fault associated with execution of said at least one operation, wherein said corresponding at least one operation comprises an operation sequence; and wherein said exception handler has scope limited to said operation sequence.

19. An apparatus, as recited in claim 18, wherein said non-architectural store targeted by said non-blocking load operation includes a register having scope limited to said at least one operation.

20. An apparatus, as recited in claim 18, further comprising:

a memory hierarchy including a cache, wherein said a prefetch instruction encodes an address in said memory hierarchy and said non-blocking load operation causes data associated with said address to be loaded into said cache without modifying architectural register state.

21. An apparatus comprising:

at least one execution unit;

an instruction decoder coupled into an instruction stream to receive and decode a prefetch instruction and to supply said at least one execution unit with at least one operation corresponding to said prefetch instruction, said corresponding at least one operation including a non-blocking load operation targeting a non-architectural store;

an exception handler having scope limited to said at least one operation and non-responsive to a fault associated with execution of said at least one operation, wherein said scope of said exception handler is further limited to said non-blocking load operation.

22. An apparatus, as recited in claim 21, wherein said non-architectural store targeted by said non-blocking load operation includes a register having scope limited to said at least one operation.

23. An apparatus, as recited in claim 21, further comprising:

a memory hierarchy including a cache, wherein said a prefetch instruction encodes an address in said memory hierarchy and said non-blocking load operation causes data associated with said address to be loaded into said cache without modifying architectural register state.

24. An apparatus comprising:

at least one execution unit;

an instruction decoder coupled into an instruction stream to receive and decode a prefetch instruction and to supply said at least one execution unit with at least one operation corresponding to said prefetch instruction, said corresponding at least one operation including a non-blocking load operation targeting a non-architectural store;

an exception handler having scope limited to said at least one operation and non-responsive to a fault associated with execution of said at least one operation; and an exception handling mechanism vectoring to a single handler for a fault condition, said single handler including plural execution sequences wherein one of said execution sequences includes said exception handler and is selected in response to an occurrence of said fault condition in context of said at least one operation.

* * * * *

UNITED STATES PATENT AND TRADEMARK OFFICE
CERTIFICATE OF CORRECTION

PATENT NO.     : 6,253,306 B1
DATED          : June 26, 2001
INVENTOR(S)    : Amos Ben-Meir and John G. Favor It is certified that error appears in the above-identified patent and that said Letters Patent is hereby corrected as shown below:

Column 2,
Line 3, replace "802-7254-01/5$_{13}$0.html" with -- 802-7254-01/5_0.html --.

Signed and Sealed this

Fifteenth Day of January, 2002

Attest:

JAMES E. ROGAN
*Director of the United States Patent and Trademark Office*

*Attesting Officer*